United States Patent
Chyz

(10) Patent No.: US 7,530,812 B2
(45) Date of Patent: May 12, 2009

(54) THREE-DIMENSIONAL DENTAL TRAINING SYSTEM

(76) Inventor: Grant T. Chyz, 1600 Federal Ave. East, Seattle, WA (US) 98102

( * ) Notice: Subject to any disclaimer, the term of this patent is extended or adjusted under 35 U.S.C. 154(b) by 238 days.

(21) Appl. No.: 11/485,510

(22) Filed: Jul. 11, 2006

(65) Prior Publication Data
US 2008/0026353 A1    Jan. 31, 2008

Related U.S. Application Data

(60) Provisional application No. 60/830,289, filed on Jul. 11, 2006.

(51) Int. Cl.
*G09B 23/28* (2006.01)
(52) U.S. Cl. .................................... 434/263
(58) Field of Classification Search ............... 434/98, 434/102, 263; 433/26, 215, 217.1, 226, 228.1
See application file for complete search history.

(56) References Cited

U.S. PATENT DOCUMENTS

| | | | | |
|---|---|---|---|---|
| 1,048,382 | A * | 12/1912 | Allen | 434/263 |
| 4,770,637 | A * | 9/1988 | Harrell, Jr. | 434/263 |
| 5,030,102 | A * | 7/1991 | Lang | 434/263 |
| 5,062,799 | A * | 11/1991 | Duncan et al. | 433/215 |
| 5,120,229 | A * | 6/1992 | Moore et al. | 434/263 |
| 5,232,370 | A * | 8/1993 | Hoye | 434/263 |
| 5,743,730 | A * | 4/1998 | Clester et al. | 433/26 |
| 6,257,895 | B1 * | 7/2001 | Oestreich | 434/274 |
| 6,520,775 | B2 * | 2/2003 | Lee | 434/263 |
| 6,524,105 | B2 * | 2/2003 | Raffeiner | 433/213 |
| 2006/0008777 | A1 | 1/2006 | Peterson et al. | |
| 2006/0009540 | A1 | 1/2006 | Jia et al. | |
| 2006/0024652 | A1 * | 2/2006 | Ose et al. | 434/263 |

FOREIGN PATENT DOCUMENTS

| | | |
|---|---|---|
| WO | WO-2006031971 | 3/2006 |
| WO | WO-2006031972 | 3/2006 |
| WO | WO-2006053410 | 5/2006 |

OTHER PUBLICATIONS

"Aesthetic Dental Center: Chairside Composite Resin Restorations (fillings)" dentistry.com. <http://www.dentistry.com/aesthetic_dental_center4.asp> 2 pages.

Santiago, DDS, Bianca Marques et al. "Composite resin restoration: a worthy treatment approach for a peg-shaped maxillary lateral incisor" First published Apr. 2004. <http://www.priory.com/den/resin.htm> 15 Pages.

(Continued)

*Primary Examiner*—Kurt Fernstrom
(74) *Attorney, Agent, or Firm*—Perkins Coie LLP

(57) ABSTRACT

A dental training system is provided for teaching direct restoration procedures for a tooth that has a color within a range of natural tooth colors. The system comprises a first restorative material couplable to a base tooth structure and having a first color outside the range of natural tooth colors. The first restorative material is configured to form a first contrasting layer on the base tooth structure. A second restorative material having a second color different than the first color is couplable to the base tooth structure and to the first contrasting layer to form a second contrasting layer adjacent to the first contrasting layer.

23 Claims, 4 Drawing Sheets

OTHER PUBLICATIONS

"What Is a Composite Resin (White Filling)?" Academy of General Dentistry. <http://www.agd.org/consumer/topics/composite/main.asp> 2 pages.

PCT International Search Report, International Application No. PCT/US07/71394, International Filing Date Jun. 15, 2007, Date of Mailing Jul. 31, 2008, 3 pages.

"Aesthetic Dental Center: Chairside Composite Resin Restorations (fillings)" dentistry.com. <http://www.densitry.com/aesthetic_dentalcenter4.asp> 2 pages, Jun. 9, 2006.

"What Is a Composite Resin (White Filling)?" Academy of General Dentistry. <http://www.agd.org/consumer/topics/composite/main.asp> 2 pages, Jun. 9, 2006.

* cited by examiner

THREE-DIMENSIONAL DENTAL TRAINING SYSTEM

CROSS REFERENCE TO RELATED APPLICATIONS

This application is a non-provisional patent application that claims priority to U.S. Provisional Patent Application No. 60/830,289, entitled THREE-DIMENSIONAL DENTAL TRAINING SYSTEM, filed Jul. 11, 2006, which is hereby incorporated herein in its entirety by reference thereto.

TECHNICAL FIELD

The present invention is related to dental devices, and more particularly to three-dimensional dental training devices.

BACKGROUND

Dental composite resin direct fillings have become preferred to amalgam fillings as a material to replace tooth structure lost from cavities and accidents. In addition, tooth-colored composite resin can be used to effect cosmetic improvement to the shape and color of natural teeth. The conventional dental composite resins exist in a variety of chemical formulas, with different fillers, shades, viscosities, and properties. Different types of composite resins can be described as unfilled resins and bonding agents, sealants, flowable composites, and restorative composites.

The unfilled resin and bonding agents are generally relatively colorless and used in adhesive systems to bond composite resin to teeth. Sealants are unfilled or lightly filled and may be colorless, or whitish. The flowable composites are used to fill small cavities, to seal teeth, and as a liner for larger fillings. The restorative composites are used fill larger recesses, and they range from a buttery consistency to a fairly dense putty-like material.

As composite resin technology has improved, and as the cosmetic expectation of patients to have natural-looking dental work has increased, techniques have been developed to layer composite resin material, using slightly different natural tooth-colored shades and opacities of material to achieve a strong and aesthetic result.

Unfortunately, the skills necessary to master the placement of two or more natural tooth-colored shades of composite resin are not the same skills necessary to condense and overfill amalgam into a cavity preparation. Dentists must learn to manage slightly different shades and opacities of composite resin material in three dimensions to achieve an optimally natural-looking tooth in shape and color.

When dentists, who were trained to overfill a cavity with amalgam filling material, are faced with a need to place the correct amount and color of material in each layer without overfilling, only those with strong three-dimensional perception and an excellent sense of color are able to adjust and create an aesthetically acceptable result. Two-dimensional illustrations typically used for training are not easily translated to three dimensions and do not provide the dentist, technician, student, hygienist, or other trainee an opportunity for hands-on practice. Training with existing products involves the use of conventional composite resin materials having shade differences so subtle that the different layers of composite resin materials are usually too difficult for the trainee to adequately perceive in an educational setting. In addition, the subtle shade differences cannot be discriminated in photographs. Accordingly, a system is needed that can simplify the visualization process and provide direct and immediate feedback to the trainee and to the instructor.

SUMMARY

The present invention is directed to a three-dimensional dental training system that overcomes drawbacks in the prior art and provides other benefits. One embodiment of the invention provides a three-dimensional dental training system for teaching direct restoration procedures for a tooth that has a color within a range of natural tooth colors. The system comprises a base tooth structure, a first restorative material, and a second restorative material. The first restorative material is couplable to the base tooth structure and has a first color outside the range of natural tooth colors. The first restorative material is configured to form a first contrasting layer on the base tooth structure. The second restorative material has a second color different than the first color. The second restorative material is couplable to the base tooth structure and to the first contrasting layer to form a second contrasting layer adjacent to the first contrasting layer.

Another embodiment provides a three-dimensional dental training system that comprises a tooth portion, a first layer of restorative material, and a second layer of restorative material. The first layer is coupled to the simulated tooth portion and has a first color outside the range of natural tooth colors. The second layer is coupled to the first layer and has a second color different than the first color. The first layer is configured so the first color is substantially obscured by the second layer when the second layer has at least a first thickness. The first layer is substantially visible if the second layer has a second thickness less than the first thickness.

Another embodiment provides a training method for teaching direct restoration of a tooth having a tooth color within a range of natural tooth colors. The method comprises applying a first restorative material to the tooth portion to form a first layer. The first layer has a first color outside the range of natural tooth colors. The method also comprises applying a second restorative material over at least a portion of the first restorative material to form a second layer and so the first layer is adjacent to the second layer. The second layer has a second color different than the first color. The method further comprises visually inspecting the second layer to determine whether the color of the first layer is visible through the second layer, thereby indicating whether the second layer is too thin relative to the first layer.

The foregoing and other aspects of the invention will now be described in more detail with reference to the accompanying drawings. This Summary section is provided to introduce in a simplified manner aspects and features further described below in the Detailed Description section and illustrated in the figures. This Summary section is not intended to limit the scope of the claimed subject matter.

DETAILED DESCRIPTION

Embodiments of the present invention include a three-dimensional dental training system for teaching techniques for direct restoration procedures of one or more teeth. Several specific details of the invention are set forth in the following detailed description and in FIGS. 1-6 to provide a thorough understanding of selected illustrative embodiments of the invention. One skilled in the art, however, will understand that the present invention may have additional embodiments and that other embodiments of the invention may be practiced without one or more of the specific features described below. In other instances, well-known structures, materials, or operations are not shown or described in order to avoid obscuring aspects of the invention.

Figure 1:
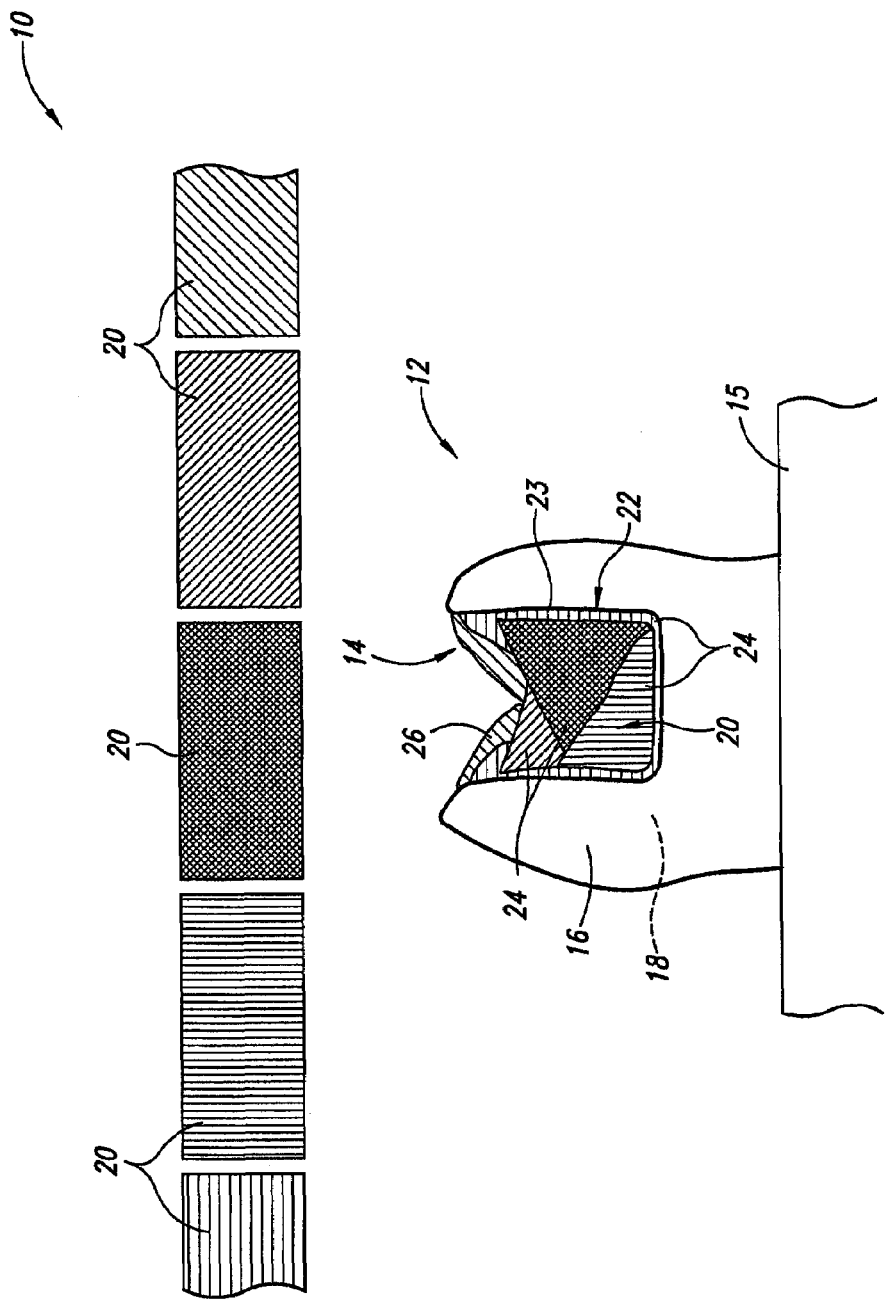
FIG. 1 is a schematic cross-sectional view of a three-dimensional dental training system in accordance with an embodiment of the invention having a simulated tooth with a plurality of layers of the non-tooth-colored restoration material disposed in or on the tooth. The orientation of the layers, the number of layers, and the colors of the layers show only one example, and other embodiments can include other orientations, numbers and colors of layers.
Figure 2:
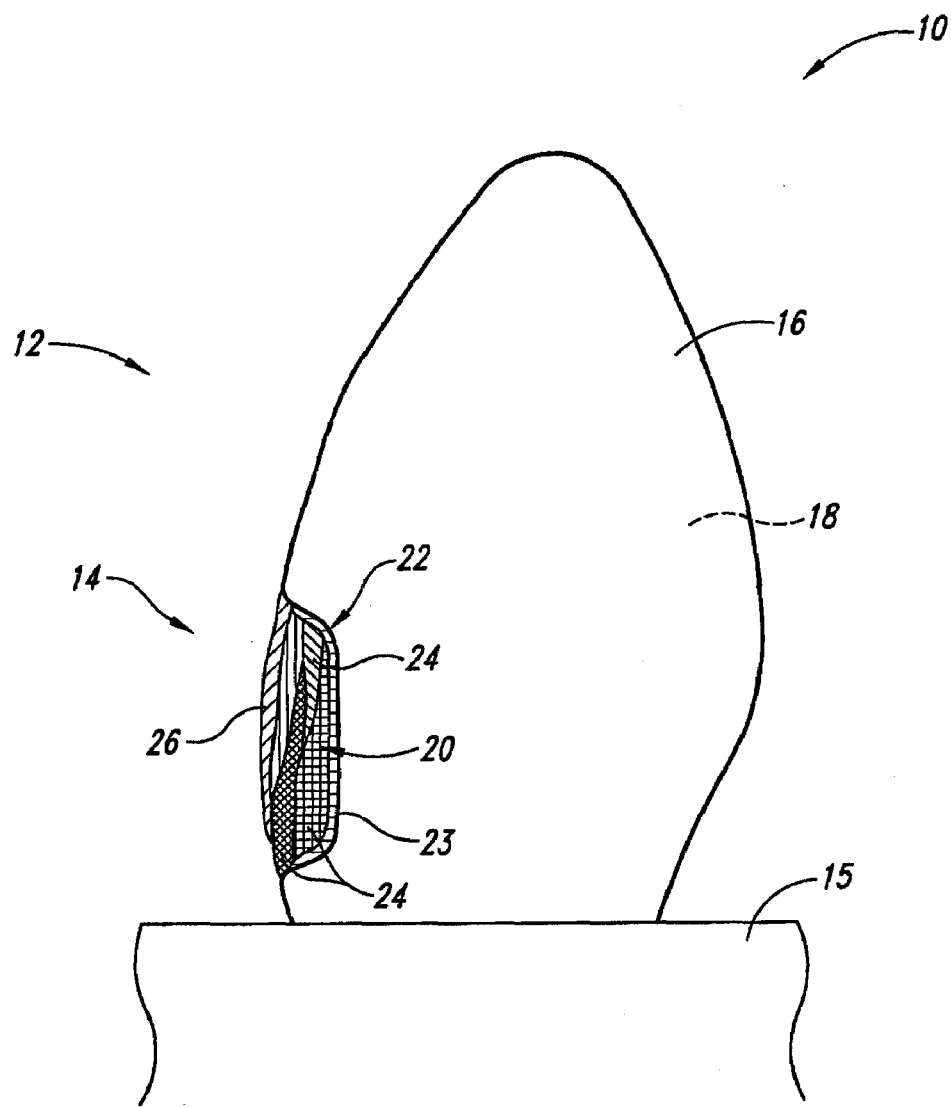
FIG. 2 is a schematic cross-sectional view of the three-dimensional dental training system with a different simulated tooth in accordance with an embodiment of the present invention.

FIG. 1 is a schematic cross-sectional view of a three-dimensional dental training system 10 in accordance with an embodiment of the invention having a simulated tooth 12 with a plurality of layers 14 of a non-tooth-colored restorative material disposed in or on the tooth. FIG. 2 is a schematic cross-sectional view of the three-dimensional dental training system with a different simulated tooth in accordance with an embodiment of the present invention. The system of the illustrated embodiment is usable to assist in the training of dentists, dental students, technicians, hygienists, or other trainees to understand, practice, and master the stratification, layering, and placement of dental composite materials in teeth to form fillings, bondings, and/or other direct restorations. In one embodiment, the system is an in vitro, hands-on training and visualization tool and is not intended to be used intraorally.

The system 10 includes a simulated tooth 12 constructed with approximately the same color, shape, and structure as an actual human tooth, but where the size may be natural or larger than natural. In one embodiment, the tooth can be removably attached to a base portion 15, such a typodont or other simulated jaw or jaw portion. The tooth 12 illustrated in FIG. 1 is a molar, and the tooth illustrated in FIG. 2 is a premolar. The simulated teeth can be constructed to include portions representing the tooth's enamel portion 16 and dentine portion 18. Other embodiments may not include these simulated portions of a tooth. Other embodiments can also include one or more teeth simulating other molars, premolars, canines, incisors, or any other tooth structure or arrangement from a mouth of a human.

Natural human teeth have colors (i.e., the combination or measurement of hue, chroma, and value under a selected light source) that fall within a range of natural tooth colors. The range of natural tooth colors is well known and is typically represented by conventional dental shade guides, such as the conventional VITA Classic, VITA 3-D Master, Bioform, Chromascope, Vitapan® Classical, and other dental shade guides. The tooth 12 of the illustrated embodiment has a color within the range of natural tooth colors. In other embodiments, the tooth can be transparent or can have a color outside the range of natural tooth colors.

The system 10 also includes a plurality of restoration materials 20 configured to be applied to the tooth 12 in layers 14 in accordance with a direct restoration procedure. The restoration materials of the illustrated embodiment include a plurality of restorative composite resins and flowable composite resin materials having colors that are distinct from each other and different than the colors of natural teeth. For example, the composite resins (or other restoration materials) can be bright, distinctive colors, such as pink, blue, green, red, orange, and purple, that can be easily visually distinguished from natural tooth colors.

These colored composite resins have consistencies, viscosities, curing characteristics, and blending characteristics that are substantially identical to the conventional tooth-colored composite resins used intraorally for actual tooth restoration of a patient. The system can also include one or more composite resins or other restorative materials with natural tooth colors that can be used with the non-tooth colored composite resins in a simulated training restoration procedure, as discussed in greater detail below.

The teeth 12 of the illustrated embodiments each have a receiving area 22 formed in or on a portion of the tooth and configured to receive and/or support the layers 14 of the restorative material. The receiving area can be a cavity preparation area or other recess in the tooth into which the layers can be applied. The receiving area can also be a prepared portion of the tooth onto or into which the restorative material can be added, such as along an edge portion of a tooth. The receiving area can also be a shaped portion of a tooth, with or without a cavity preparation or another recess, onto which the restorative material is attached.

In FIG. 1, a simulated molar is shown with the receiving area 22 formed as a cavity preparation 23 in the top portion of the tooth. In FIG. 2, a simulated premolar is shown with the receiving area 22 formed as a cavity preparation 23 in the side of the tooth. The cavity preparation is shaped and sized to simulate a hole that would be formed in a tooth in preparation for applying a filling or other direct restoration material to the tooth. The tooth or receiving area can also be shaped and sized to simulate a broken tooth or other dental condition that typically requires the application of direct restoration materials.

The layers 14 of restoration material include interior layers 24 of one or more composite resins having a color outside the range of natural tooth colors. In the illustrated embodiment, the cavity preparation 23 in the molar is sized to simulate a filling procedure. The curing and shrinkage characteristics of the composite resins are such that multiple interior layers are needed to adequately fill (while not overfilling) a substantial portion of the recess. The interior layers are adhered to the tooth 12 in a conventional manner, such as by light curing or other technique.

Each of the interior layers can have the same non-natural tooth color, especially if the same composite resin is used for each layer to build up the material within the receiving area. In another embodiment, each of the interior layers can have distinctly different hues, chromas, and/or other color features that help the trainee visually distinguish and monitor the application characteristics (i.e., location and thickness) of the layers relative to each other and relative to the tooth. When the interior layers are formed by different types of composite resins or different restoration materials, these different materials can also have hues, chromas, or other color features distinctly different from each other. The interior layers are shown as having bright pink, blue, orange and red colors, although other colors different than a natural tooth color can be used.

A surface layer 26 of a flowable composite resin is disposed in the recess 22 over the interior layers 24. The system is provided with restoration materials for the surface layer that have colors different and visually distinguishable from the color(s) of the interior layers. The color of the surface layer in the illustrated embodiment is a yellow color, although other colors different from a natural tooth color could be used. In another embodiment, restoration materials for surface layers can have colors that are within the range of colors of a natural tooth and that are easily distinguished visually from the color(s) of the interior layers 24.

The system 10 is configured so that the colored layers will provide a clear visual indication about whether the interior layers 24 and/or the surface layer 26 have been applied correctly. For example, if the interior layers 24 as applied are too thick, if the surface layer 26 is applied too thin, or if too much of the surface layer has been removed during shaping or polishing, the distinct color of the interior layer will be visible through the surface layer. On the other hand, if the interior layers and surface layer(s) are properly applied with an appropriate thickness and distribution, the interior layer will not be visible through the surface layer.

In one embodiment, the surface layer 26 is a partially translucent flowable composite resin, so that the interior layer(s) 24 will not be clearly visible through the surface layer unless the surface layer is too thin. In another embodiment, the surface layer(s) can be a substantially opaque material, so that the interior layer(s) will not be visible through the surface layer until a portion of the surface layer is ground away or otherwise removed to expose a portion of an interior layer. In one embodiment, the interior layer(s) can be darker than the surface layer, which may allow the interior layer(s) to be visible through the surface layer when the interior layers are too thick, which means that surface layer is too thin.

Figure 3:
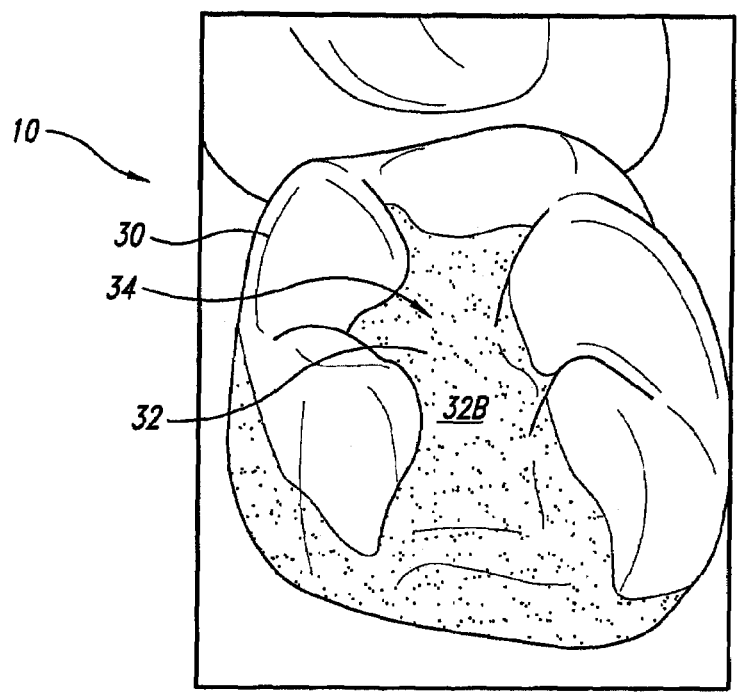
FIG. 3 is a top isometric view of a simulated tooth having a first layer of tinted restoration material in a cavity preparation formed in the tooth.
Figure 4:
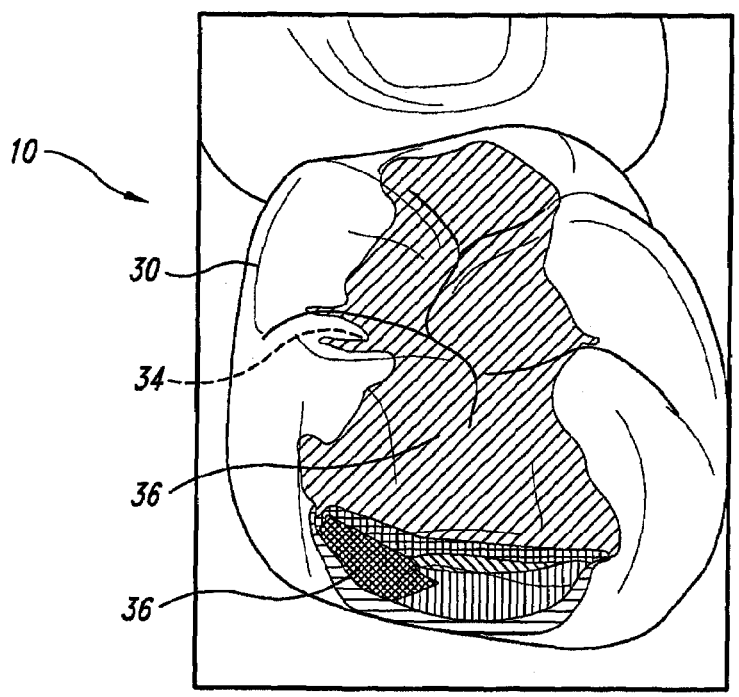
FIG. 4 is a top isometric view of the simulated tooth of FIG. 3 having a plurality of layers of tinted restoration material in the cavity preparation.

An example of using the system 10 as a three-dimensional training tool to demonstrate various techniques for direct tooth restoration using various dental composite resins of different viscosities, curing characteristics, or other operational characteristics is shown in FIGS. 3 and 4. FIG. 3 is a top isometric view of a simulated molar 30 having a cavity preparation 34 formed therein. A series of interior layers 32 of colored composite resin are applied to the molar in the cavity preparation. The interior layers are formed by colored composite resin, each having a color not within the range of natural tooth colors.

Each of the interior layers 32 is applied, cured, and, to the extent necessary, shaped or worked prior to applying the next layer. In the illustrated embodiment, at least two interior layers are applied in the cavity preparation 34. The first layer 32A (not visible) has a selected color, such as bright orange (or any other color), and the second layer 32B has a bright pink color. If the second layer is not properly applied, the orange color of the first layer will be visible to the trainee. In one embodiment, the interior layers can be formed of the same type of composite resin with different colors or the same color. In another embodiment, the interior layers can be formed by different types of composite resin having different characteristics as needed or desired depending upon the restoration procedure involved.

As best seen in FIG. 4, after the interior layers are applied, cured, and worked as needed, the trainee would apply one or more surface layers 36 to the cavity preparation 34 over the second layer 32B. The surface layer is a composite resin having a color different than the color of the adjacent interior layer. In the illustrated embodiment, the surface layers are shown as yellow and blue, although other colors can be used. For example, the surface layer can be a color that contrasts with the color of the interior layer and that is not within the range of natural tooth colors. In another embodiment, the surface layer can be a color that substantially matches the color of a natural tooth, as defined by the dental shade guides. The surface layer can also be opaque, translucent, or partially translucent.

During or after the time the surface layer 36 is applied, cured, shaped, and polished, the trainee would be able to visually determine whether the surface layer is fully covering the interior filler material and whether the restoration procedure was executed properly. The layers with distinct colors also make it easier for the trainee to see exactly where the new layer is, and the distinct colors make it easier for an instructor to evaluate the placement of the layers. Accordingly, this process provides substantially instant visual feedback for a trainee. If the procedure was not executed correctly, the surface layer(s) and/or interior layer(s) can be removed and a portion of the procedure repeated. Alternatively, the filled molar may be removed and replaced with a new blank or unfilled molar so the trainee can try again to properly complete the procedure. When the trainee has mastered the techniques using the training system 10, he or she will be able to translate the skills to the use of naturally colored composite resin materials.

Figure 5:
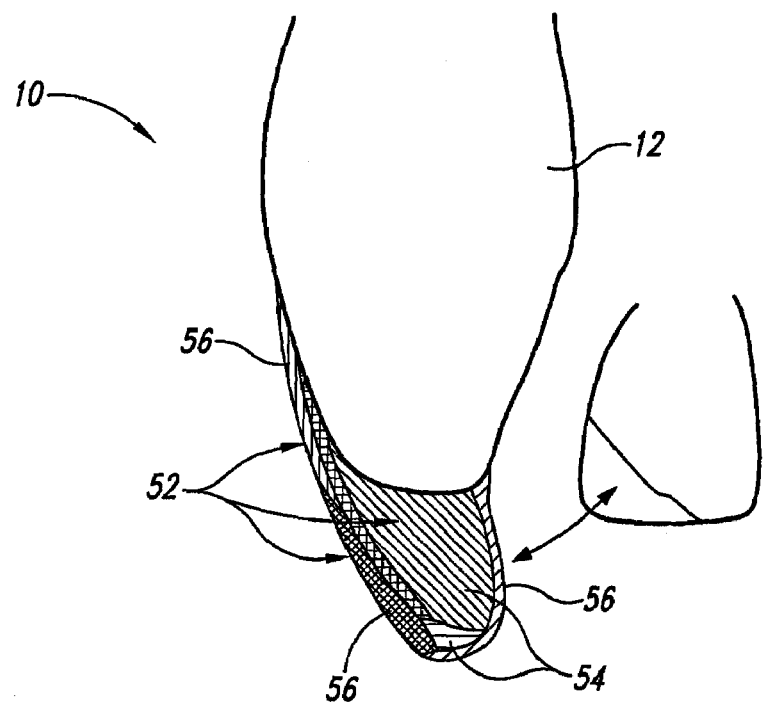
FIG. 5 is a cross-sectional side view of a broken incisor tooth with a plurality of layers of tinted restoration material attached to a receiving area on the tooth in accordance with another embodiment of the invention.
Figure 6:
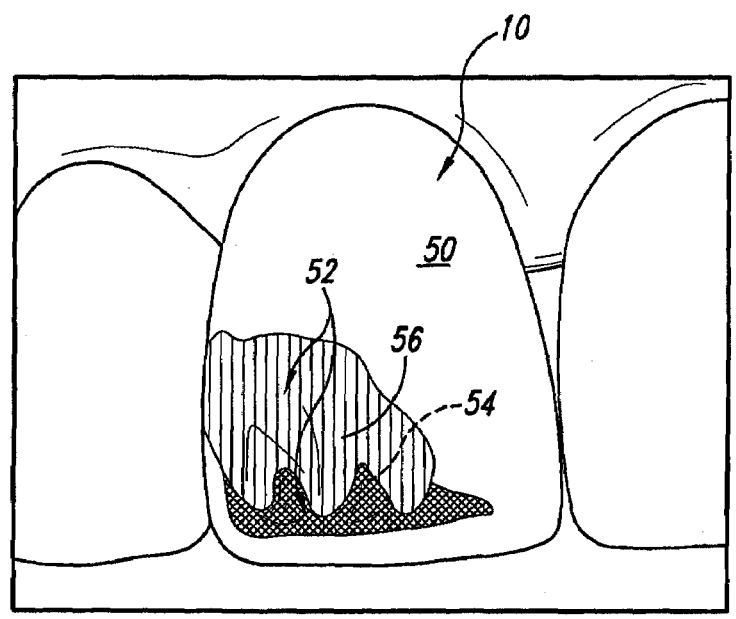
FIG. 6 is a front elevation view of the simulated incisor tooth of FIG. 5 having the plurality of layers of tinted restoration material thereon.

The above embodiments are discussed in connection with filling a cavity preparation or other hole in a tooth. In other embodiments, the system is configured for use with a tooth shaped to simulate a broken tooth. FIG. 5 is a cross-sectional side view of a simulated broken incisor with a plurality of layers of restoration material attached to a receiving area on the tooth. FIG. 6 is a front elevation view of the simulated broken incisor tooth 50 with a plurality of composite resin layers 52 having distinctly colored layers applied thereon in accordance with an embodiment of the present invention.

A conventional procedure to directly reconstruct a real broken tooth typically requires, as an example, approximately 5-8 layers of composite resin materials with different natural tooth colors and with different thicknesses, shades, and opacities to achieve a natural-looking reconstruction that appropriately matches or blends with one or more adjacent teeth. The last few layers of the composite resins are typically very thin and applied very carefully. If the under layers have been applied too thick, one or more of the outer layers can be inadvertently removed during the shaping and polishing process.

In the illustrated embodiment, the system 10 is used to teach a trainee how to correctly execute the reconstruction procedure of a broken tooth. A plurality of under layers 54 and a plurality of thin outer layers 56 are applied to the simulated broken tooth. The under layers and the outer layers of the illustrated embodiment have contrasting colors, so that if a layer is too thin or is removed in an area through shaping and/or polishing, the contrasting color of the next layer will be clearly visible. Accordingly, the system provides for instant training feedback to the trainee regarding the adequacy of the layering and stratification for fixing a broken tooth or other direct restoration procedure.

From the foregoing, it will be appreciated that specific embodiments of the invention have been described herein for purposes of illustration, but that various modifications may be made without deviating from the spirit and scope of the invention. Accordingly, the invention is not limited except as by the appended claims.

I claim:

1. A three-dimensional dental training system for teaching direct restoration procedures for a tooth having a color within a range of natural tooth colors, comprising:
 a simulated tooth structure;
 a first restorative material couplable to the simulated tooth structure and having a first color outside the range of natural tooth colors, the first restorative material being configured to form a first contrasting layer on the simulated tooth structure; and
 a second restorative material having a second color different than the first color and being couplable to the simulated tooth structure and to the first contrasting layer to form a second contrasting layer with the first contrasting layer being intermediate the simulated tooth structure and the second contrasting layer wherein the second color of the second restorative material is outside the range of natural tooth colors.

2. The system of claim 1 wherein the second restorative material is configured so the first color is substantially obscured through the second contrasting layer when the second contrasting layer has at least a first thickness, and being configured so the first contrasting layer is at least partially visible through the second layer if the second layer has a second thickness less than the first thickness.

3. The system of claim 1 wherein the first layer is adhered directly to the simulated tooth structure.

4. The system of claim 1 wherein the second layer is adhered directly to the first layer.

5. The system of claim 1, further comprising a plurality of layers of restorative material between the second layer and the simulated tooth structure, at least one of the plurality of layers having a color outside the range of natural tooth colors.

6. The system of claim 1 wherein the second layer is darker than the first layer.

7. A three-dimensional dental training system for teaching direct restoration procedures for a tooth having a color within a range of natural tooth colors, comprising:
 a simulated tooth structure;
 a first restorative material couplable to the simulated tooth structure and having a first color outside the range of natural tooth colors, the first restorative material being configured to form a first contrasting layer on the simulated tooth structure, wherein the first restorative material is a tinted restorative composite; and
 a second restorative material having a second color different than the first color and being couplable to the simulated tooth structure and to the first contrasting layer to form a second contrasting layer with the first contrasting layer being intermediate the simulated tooth structure and the second contrasting layer.

8. A three-dimensional dental training system for teaching direct restoration procedures for a tooth having a color within a range of natural tooth colors, comprising:
 a simulated tooth structure;
 a first restorative material couplable to the simulated tooth structure and having a first color outside the range of natural tooth colors, the first restorative material being configured to form a first contrasting layer on the simulated tooth structure;
 a second restorative material having a second color different than the first color and being couplable to the simulated tooth structure and to the first contrasting layer to form a second contrasting layer with the first contrasting layer being intermediate the simulated tooth structure and the second contrasting layer; and further a comprising plurality of restorative materials configured to form a plurality of layers between the second layer and the simulated tooth structure, each of the plurality of restorative materials having a color outside of the range of natural tooth colors, and each of the plurality of restorative materials having a color different than the color of other layers of the plurality of restorative materials.

9. A three-dimensional dental training system for teaching direct restoration procedures for a tooth having a color within a range of natural tooth colors, comprising:
 a simulated tooth portion;
 a first layer of restorative material coupled to the simulated tooth portion, the first layer having a first color outside the range of natural tooth colors; and
 a second layer of restorative material coupled to the first layer, the second layer having a second color different than the first color;
 wherein the first layer is configured so the first color is substantially obscured by the second layer when the second layer has at least a first thickness and is configured so the first layer is substantially visible if the second layer has a second thickness less than the first thickness.

10. The system of claim 9 wherein the simulated tooth portion simulates one of a molar, a premolar, a canine, and an incisor of a human.

11. The system of claim 9, further comprising a plurality of layers of restorative material coupled to the second layer, at least one of the plurality of layers having a color outside the range of natural tooth colors and different than the second color.

12. The system of claim 9, further comprising a plurality of layers of composite resin coupled to the second layer, each of the plurality of layers having a color outside of the range of natural tooth colors, and each of the plurality of layers having a color different than the color of other layers of the plurality of layers.

13. The system of claim 9, further comprising a third layer of restorative material intermediate the second layer and the tooth portion, the third layer having a third color different than the second color and outside the range of natural tooth colors.

14. The system of claim 13 wherein the third layer is darker than the second layer.

15. The system of claim 9 wherein the second layer is substantially opaque.

16. A training method for teaching direct restoration of a tooth having a tooth color within a range of natural tooth colors, the method comprising;
 applying a first restorative material to a simulated tooth portion to form a first layer, the first layer having a first color outside the range of natural tooth colors;
 applying a second restorative material over at least a portion of the first restorative material to form a second layer so that the first layer is coupled to the second layer, the second layer having a second color different than the first color; and
 visually inspecting the second layer to determine whether the color of the first layer is visible through the second layer, thereby indicating whether the second layer is too thin relative to the first layer.

17. The method of claim 16, further comprising shaping a portion of the second layer to simulate a portion of the tooth.

18. The method of claim 17 wherein visually inspecting includes visually inspecting the second layer after shaping the portion of the second layer.

19. The method of claim 16 wherein the first and second layers are applied so that the first layer is at least partially visible through the second layer, if the second layer is applied with an insufficient thickness to conceal the first layer.

20. The method of claim 16 wherein applying the first restorative material includes applying a first colored composite resin, and applying the second restorative material includes applying a second colored composite resin.

21. The method of claim 16, further comprising applying a third layer of restorative material adjacent to the first layer and intermediate the first layer and the simulated tooth portion.

22. The method of claim 16, further comprising sequentially coupling a plurality of layers of composite resins to the simulated tooth portion before applying the second layer, at least one of the plurality of layers of composite resins having a color different than the second color.

23. The method of claim 16, further comprising sequentially adding a plurality of layers of restorative materials to the simulated tooth portion before applying the second layer, each of the plurality of layers of restorative materials having a color outside of the range of natural tooth colors, and each of the plurality of layers having a color different than the color of other layers of the plurality of layers.

* * * * *